(12) United States Patent
Gomi et al.

(10) Patent No.: US 7,710,625 B2
(45) Date of Patent: May 4, 2010

(54) LIGHT SCANNING APPARATUS THAT STOPS DRIVING OSCILLATION MIRROR WHEN CHANGE OF AMPLITUDE OF OSCILLATION MIRROR EXCEEDS PREDETERMINE VALUE

(75) Inventors: Akihiro Gomi, Fujimi-machi (JP); Yujiro Nomura, Shiojiri (JP); Ken Ikuma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 295 days.

(21) Appl. No.: 11/846,432

(22) Filed: Aug. 28, 2007

(65) Prior Publication Data
US 2009/0021817 A1 Jan. 22, 2009

Related U.S. Application Data

(62) Division of application No. 11/462,171, filed on Aug. 3, 2006, now Pat. No. 7,436,564.

(30) Foreign Application Priority Data

Aug. 3, 2005 (JP) .............................. 2005-224945
Aug. 4, 2005 (JP) .............................. 2005-226206

(51) Int. Cl.
*G02B 26/08* (2006.01)
(52) U.S. Cl. .................. 359/213.1; 359/199.1; 359/900; 250/236
(58) Field of Classification Search .............. 359/213.1, 359/199.1, 900; 250/234–236
See application file for complete search history.

(56) References Cited

U.S. PATENT DOCUMENTS

| | | | |
|---|---|---|---|
| 4,686,363 | A | 8/1987 | Schoon |
| 6,232,861 | B1 | 5/2001 | Asada |
| 6,262,827 | B1 | 7/2001 | Ueda et al. |
| 6,400,384 | B1 | 6/2002 | Kuwabara |
| 6,678,493 | B2 | 1/2004 | Maeyama et al. |

(Continued)

FOREIGN PATENT DOCUMENTS

JP         06006990 A       1/1994

(Continued)

*Primary Examiner*—Stephone B Allen
*Assistant Examiner*—Jennifer L. Doak
(74) *Attorney, Agent, or Firm*—Hogan & Hartson LLP

(57) ABSTRACT

A light scanning apparatus makes a light beam scan along a main scanning direction on an effective scanning region which has a predetermined width. The apparatus comprises: a light source which emits the light beam; a deflector which includes an oscillation mirror which oscillates about an oscillatory axis which is orthogonal or approximately orthogonal to the main scanning direction, deflects the light beam emitted from the light source using the oscillation mirror, and makes the light beam scan a second scanning range which contains but extends beyond a first scanning range which corresponds to the effective scanning region; a detector which detects the scanning light beam which moves through a position which is outside the first scanning range but is within the second scanning range, and outputs a signal; and a controller which controls a mirror drive signal fed to the oscillation mirror based on the output signal from the detector and accordingly adjusts the amplitude of the oscillation mirror. In the apparatus above, the controller stops driving the oscillation mirror when confirming based on the output signal that the oscillation mirror is under abnormal control.

17 Claims, 12 Drawing Sheets

U.S. PATENT DOCUMENTS

| | | |
|---|---|---|
| 2002/0122217 A1 | 9/2002 | Nakajima |
| 2003/0090563 A1 | 5/2003 | Tomita et al. |
| 2005/0093968 A1 | 5/2005 | Iwamoto |
| 2008/0106777 A1 | 5/2008 | Weir |
| 2008/0278784 A1 | 11/2008 | Abe |

FOREIGN PATENT DOCUMENTS

| | | |
|---|---|---|
| JP | 06014565 A | 1/1994 |
| JP | 09-197334 | 7/1997 |
| JP | 2001359286 A | 12/2001 |
| JP | 2002341285 A | 11/2002 |
| JP | 2003-140078 | 5/2003 |

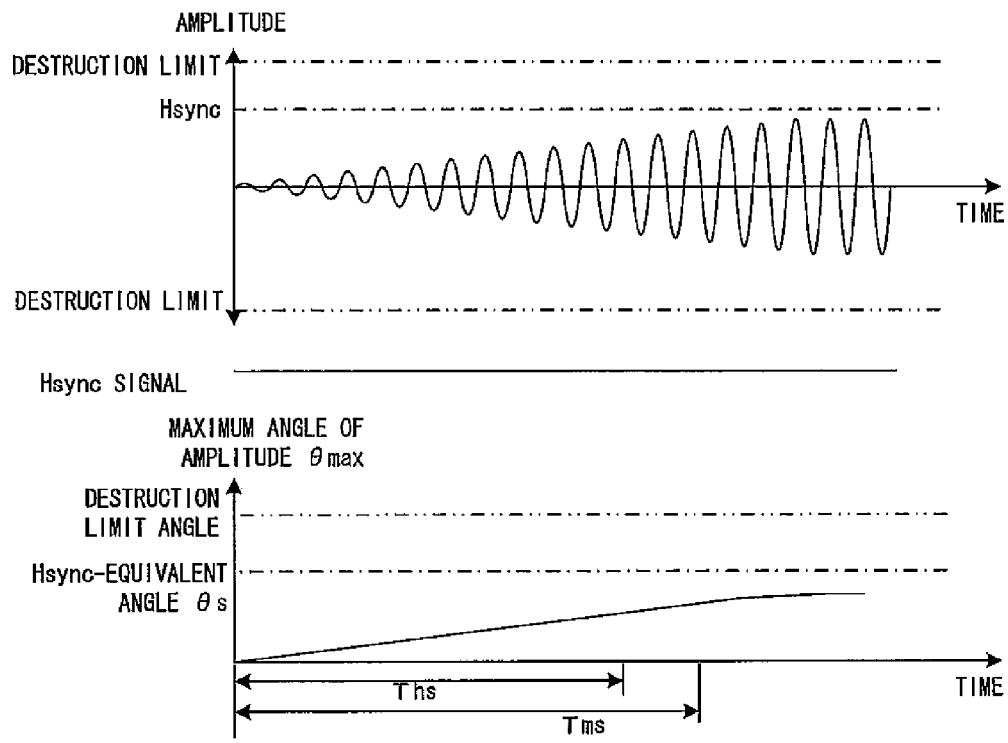
FIG. 7A: DRIVE FREQUENCY AND RESONANCE FREQUENCY DO NOT MATCH WITH EACH OTHER
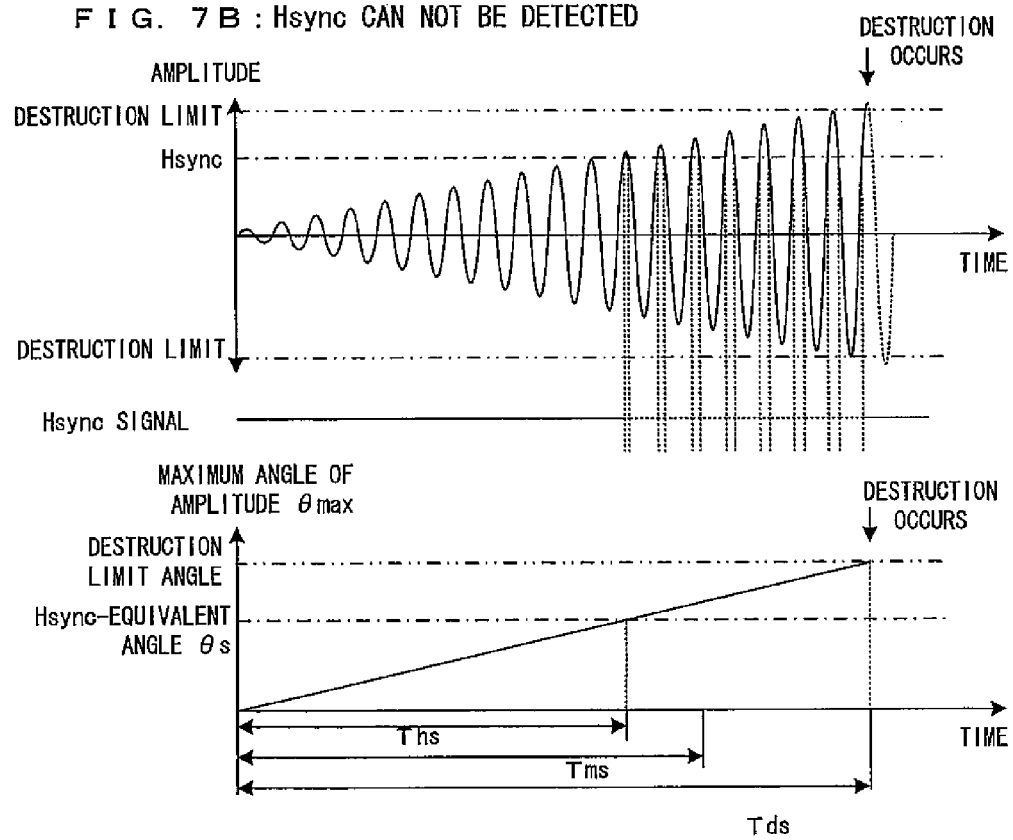
FIG. 7B: Hsync CAN NOT BE DETECTED

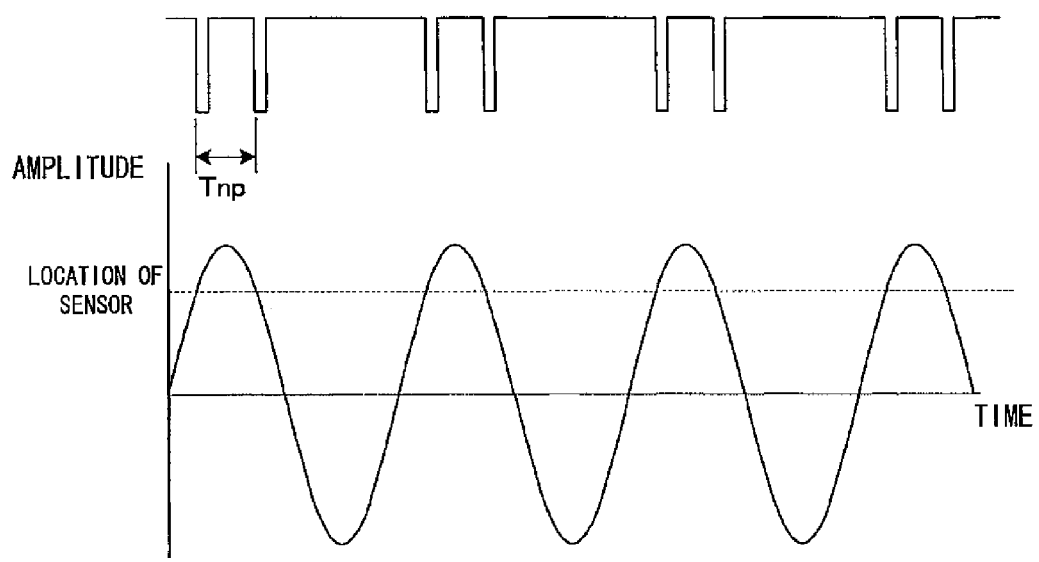
FIG. 10A : NORMAL OPERATION
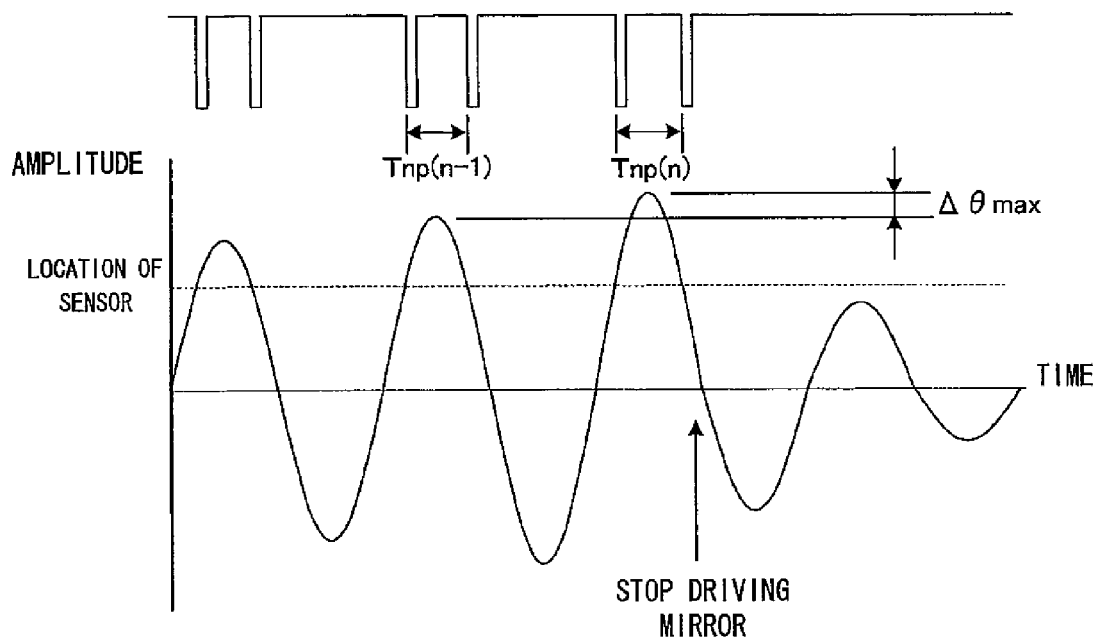
FIG. 10B : ABNORMAL OPERATION

LIGHT SCANNING APPARATUS THAT STOPS DRIVING OSCILLATION MIRROR WHEN CHANGE OF AMPLITUDE OF OSCILLATION MIRROR EXCEEDS PREDETERMINE VALUE

CROSS REFERENCE TO RELATED APPLICATION

This application is a divisional of application Ser. No. 11/462,171, filed on Aug. 3, 2006, which claims priority under 35 USC 119 in Japanese patent application no. 2005-224945, filed on Aug. 3, 2005, and Japanese patent application no. 2005-226206, filed on Aug. 4, 2005, the entire contents of which applications are hereby incorporated by reference in their entireties.

The disclosure of Japanese Patent Applications enumerated below including specification, drawings and claims is incorporated herein by reference in its entirety:

No. 2005-224945 filed Aug. 3, 2005; and

No. 2005-226206 filed Aug. 4, 2005.

BACKGROUND

1. Technical Field

The present invention relates to a light scanning apparatus which deflects a light beam using an oscillation mirror and makes the light beam scan in a main scanning direction, and also to a method of controlling such an apparatus. The present invention relates to an image forming apparatus having such a light scanning apparatus, too.

2. Related Art

It is conventionally proposed that a light scanning apparatus has a resonance-type oscillation mirror formed using a micromachining technique as a deflector. Such an oscillation mirror has a deflecting mirror surface which is capable of oscillating about a drive shaft. As the deflecting mirror surface oscillates in sine vibration in response to a drive signal fed from outside, a light beam incident upon the deflecting mirror surface is deflected in a main scanning direction.

Further, a light detecting sensor is disposed at a predetermined location within the light scanning apparatus. Hence, it is possible to detect a light beam which moves passed one end of a scanning range for the light beam (in the vicinity of the maximum amplitude). The drive signal is controlled based on an output signal from the light detecting sensor and the angle of amplitude of the light beam is accordingly set to a predetermined value, which realizes so-called amplitude control. It is therefore necessary in amplitude control to drive the oscillation mirror such that the scanning light beam impinges upon the light detecting sensor, that is, such that the maximum amplitude of the light beam is equal to or exceeds an angle which corresponds to the location at which the light detecting sensor is disposed.

In the apparatus described in JP-A-2003-140078 for instance, a drive signal at a pre-set initial drive current (drive control variable) is fed to drive a resonance-type actuator (which corresponds to the "oscillation mirror" of the invention). The current setting value of the drive signal is gradually increases until a photo diode (i.e., a detector such as a light detecting sensor) has detected a laser beam. After detection of the laser beam, amplitude control of the laser beam is performed in accordance with the detection result. The light scanning apparatus having the structure may be installed in an image forming apparatus or the like to function as an exposure unit.

SUMMARY

As described above, a light source emits the light beam and the light detecting sensor detects the light beam deflected by the oscillation mirror. Therefore, it is confirmed that the angle of amplitude of the oscillation mirror has increased to such a degree that can be controlled through amplitude control. The confirmation is based on the two preconditions: (1) the light source is emitting the light beam; and (2) the light detecting sensor is operating normally. Hence, when there is a trouble with the light source or the light detecting sensor, an influence due to a noise, etc., the light detecting sensor may fail to output the detection signal indicative of the light beam even though the angle of amplitude of the oscillation mirror is equal to or larger than an angle which corresponds to the location at which the light detecting sensor is disposed. On that occasion, it is not possible to enter amplitude control based on an output signal from the light detecting sensor, which could further vibrate and destroy the oscillation mirror. Thus the abnormal controlling in the apparatus may cause the oscillation mirror to crash. In the case of a light scanning apparatus which exercises amplitude control after activating an oscillation mirror at or beyond a predetermined angle of amplitude therefore, it is very important to prevent without fail the oscillation mirror from vibrating up to its destruction limit angle. The reason is that the light detecting sensor for some reason may fail to properly output a detection signal indicative of a light beam.

The conventional apparatus comprises a controller for the purpose of controlling the amplitude of the oscillation mirror which may be a resonance-type actuator or the like. The controller is configured so as to control the drive control variable such as a drive current based on the signal which is output from the light detecting sensor. The amplitude of the oscillation mirror is adjusted by means of control of the drive control variable. When the controller feeds an improper drive signal to the oscillation mirror under the influence of a noise or disturbance therefore, the angle of amplitude of the oscillation mirror could significantly change. Particularly when a noise or other influential factor acts to additionally vibrate the oscillation mirror, the oscillation mirror could oscillate beyond its destruction limit angle and get destroyed. Thus, the noise or other influential factor may make the apparatus come into the abnormal control condition, so that the oscillation mirror is crashed. Hence, it is very important to prevent without fail an oscillation mirror from vibrating up to its destruction limit angle in the case of a light scanning apparatus in which the oscillation mirror makes a light beam scan.

An object of the invention is to prevent destruction of an oscillation mirror in a light scanning apparatus in which a detector such as a light detecting sensor detects a light beam which is made scan by the oscillation mirror of the resonance-type and the oscillation mirror is controlled based on the detection result.

An apparatus according to an aspect of the present invention is a light scanning apparatus which makes a light beam scan along a main scanning direction on an effective scanning region which has a predetermined width. The apparatus comprises: a light source which emits the light beam; a deflector which includes an oscillation mirror which oscillates about an oscillatory axis which is orthogonal or approximately orthogonal to the main scanning direction, deflects the light beam emitted from the light source using the oscillation mirror, and makes the light beam scan a second scanning range which contains but extends beyond a first scanning range which corresponds to the effective scanning region; a detector which detects the scanning light beam which moves through a position which is outside the first scanning range but is within the second scanning range, and outputs a signal; and a controller which controls a mirror drive signal fed to the oscillation mirror based on the output signal from the detector and accordingly adjusts the amplitude of the oscillation mirror. In the apparatus above, the controller stops driving the oscillation mirror when confirming based on the output signal that the oscillation mirror is under abnormal control.

A method according to an aspect of the present invention is a method of controlling a light scanning apparatus, which deflects a light beam from a light source along a main scanning direction using an oscillation mirror which resonates and makes the light beam scan on an effective scanning region, according to which while the oscillation mirror is driven so that the light beam scans a second scanning range which contains but extends beyond a first scanning range corresponding to the effective scanning region, a detector detects this scanning light beam which moves passed a position which is within the second scanning range but outside the first scanning range, a mirror drive signal fed to the oscillation mirror is controlled in accordance with a signal which the detector outputs, and the amplitude of the oscillation mirror is accordingly adjusted. The method comprises: detecting a reciprocal light beam, which moves from the effective scanning region via the detector and returns back to the effective scanning region via the detector, for every oscillation cycle of the oscillation mirror and outputting a signal; and stopping the driving of the oscillation mirror upon confirmation based on the output signal that the oscillation mirror is under abnormal control.

An apparatus according to another aspect of the present invention comprises: a latent image carrier which has an effective scanning region which has a predetermined width along a main scanning direction; an exposure unit which scans a light beam on the effective scanning region so as to form a latent image; an exposure controller which controls the exposure unit; and a developing unit which develops the latent image with toner to form a toner image. In the apparatus, the exposure unit includes: a light source which emits the light beam; a deflector which has an oscillation mirror which oscillates about an oscillatory axis which is orthogonal or approximately orthogonal to the main scanning direction, deflects the light beam emitted from the light source using the oscillation mirror, and makes the light beam scan a second scanning range which contains but extends beyond a first scanning range which corresponds to the effective scanning region; and a detector which detects the scanning light beam which moves through a position which is outside the first scanning range but is within the second scanning range, and outputs a signal, and the exposure controller controls a mirror drive signal fed to the oscillation mirror based on the output signal from the detector and accordingly adjusts the amplitude of the oscillation mirror, meanwhile stops driving the oscillation mirror when confirming based on the output signal that the oscillation mirror is under abnormal control.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 7A and 7B are diagrams which show an abnormal operation during the start-up processing;

FIGS. 10A and 10B are drawings which show how amplitude of a deflector changes and a state in which a detection signal is output;

DESCRIPTION OF EXEMPLARY EMBODIMENTS

First Embodiment

Figure 1:
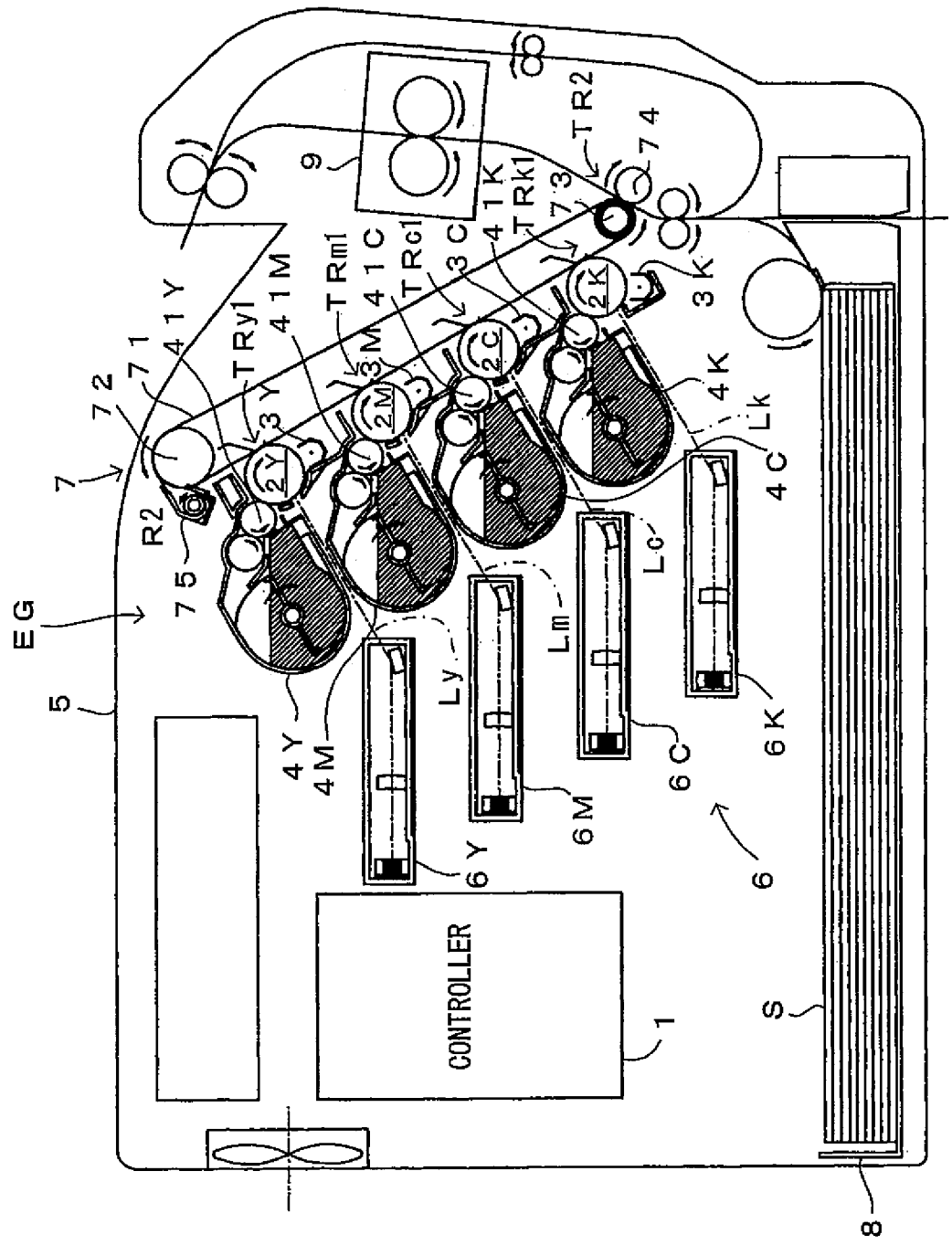
FIG. 1 is a diagram showing an image forming apparatus according to a first embodiment of the present invention.

FIG. 1 is a diagram showing an image forming apparatus according to a first embodiment of the invention. This image forming apparatus is a so-called tandem color printer wherein photosensitive members 2Y, 2M, 2C, 2K for four colors of yellow Y, magenta M, cyan C and black K, as latent image carriers, are juxtaposed in an apparatus body 5. The apparatus is adapted to form a full-color image by superimposing toner images on the individual photosensitive members 2Y, 2M, 2C, 2K, or to form a monochromatic image using only the toner image of black (K). The image forming apparatus operates as follows. When an external apparatus such as a host computer applies an image forming command to a controller 1 in response to a request from a user wanting to form an image, the controller 1 sends image signals, a reference signal, control signals and the like. In response to the signals from the controller 1, individual parts of an engine section EG operate to form the image corresponding to the image forming command on a sheet S such as copy sheet, transfer sheet, paper and transparent sheet for OHP.

In the engines EG, charger units, developing units, exposure units and cleaners are provided in correspondence to respective ones of the four photosensitive members 2Y, 2M, 2C, and 2K. Thus, the photosensitive member, the charger unit, the developing unit, the exposure unit and the cleaner are provided on a per-toner-color basis, thereby constituting an image forming unit for forming a toner image of each corresponding toner color. The individual parts of the image forming units are controlled based on signals from the controller 1, so as to carry out image formation. It is noted here that these image forming units (the photosensitive members, charger units, developing units, exposure units and cleaners) for the respective color components are arranged the same way. Therefore, the arrangement for the yellow color component is described here while individual parts of the arrangements for the other color components are represented by equivalent reference characters, respectively, and the description thereof is dispensed with.

The photosensitive member 2Y is arranged to be rotatable in a direction of an arrow in FIG. 1 (sub-scan direction). More specifically, the photosensitive member 2Y is mechanically connected with a drive motor (not shown) at one end thereof, so as to be drivably controlled based on a rotative drive command from the controller 1. Thus, the photosensitive member 2Y is driven into rotary motion. A charger unit 3Y, a developing unit 4Y and a cleaner (not shown) are arranged around the photosensitive member 2Y along the rotational direction. The charger unit 3Y comprises a scorotron charger, for example, which is applied with a charging bias from the controller 1 thereby uniformly charging an outside surface of the photosensitive member 2Y to a predetermined surface potential. An exposure unit 6Y emits a scan light beam Ly toward the outside surface of the photosensitive member 2Y so charged by the charger unit 3Y. Thus, an electrostatic latent image corresponding to yellow image data included in the image forming command is formed on the photosensitive member 2Y. The exposure unit 6Y corresponds to an embodiment of a light scanning apparatus according to the present invention. Arrangements and operations of the exposure unit 6 (6Y, 6M, 6C, 6K) and a control unit for controlling the exposure unit will be described in details hereinlater.

The electrostatic latent image thus formed is developed with toner by means of the developing unit 4Y. The developing unit 4Y contains therein a yellow toner. When the controller 1 applies a developing bias to a developing roller 41Y, the toner carried on the developing roller 41Y is made to locally adhere to surface portions of the photosensitive member 2Y according to the surface potentials thereof. As a result, the electrostatic latent image on the photosensitive member 2Y is visualized as a yellow toner image. A DC voltage or a DC voltage superimposed with an AC voltage may be used as the developing bias to be applied to the developing roller 41Y. There is an image forming apparatus of a non-contact development system wherein the photosensitive member 2Y is spaced away from the developing roller 41Y and the toner is made to jump between these members for accomplishing the development with toner. Particularly in the image forming apparatus, the developing bias may preferably have a waveform formed by superimposing a sinusoidal-wave, triangular-wave or rectangular-wave AC voltage on the DC voltage such as to effect efficient toner jumps.

The yellow toner image developed by the developing unit 4Y is primarily transferred onto an intermediate transfer belt 71 of a transfer unit 7 in a primary transfer region TRy1. The other members for the other color components than yellow are arranged absolutely the same way as those for yellow. A magenta toner image, a cyan toner image and a black toner image are formed on the respective photosensitive members 2M, 2C, 2K and are primarily transferred onto the intermediate transfer belt 71 in respective primary transfer regions TRm1 TRc1, TRk1.

The transfer unit 7 includes: an intermediate transfer belt 71 entrained about two rollers 72, 73; and a belt driver (not shown) operative to drive the roller 72 into rotation thereby rotating the intermediate transfer belt 71 in a predetermined rotational direction R2. The transfer unit 7 is further provided with a secondary transfer roller 74. The roller 74 confronts the roller 73 with the intermediate transfer belt 71 interposed therebetween and is adapted to be moved into contact with or away from a surface of the belt 71 by means of an unillustrated electromagnetic clutch. In a case where a color image is transferred to the sheet S, primary transfer timings are controlled to superimpose the individual toner images on each other thereby to form the color image on the intermediate transfer belt 71. Then, the color image is secondarily transferred onto the sheet S taken out from a cassette 8 and delivered to a secondary transfer region TR2 between the intermediate transfer belt 71 and the secondary transfer roller 74. In a case where a monochromatic image is transferred onto the sheet S, on the other hand, only a black toner image is formed on the photosensitive member 2K and the monochromatic image is secondarily transferred onto the sheet S delivered to the secondary transfer region TR2. The sheet S thus secondarily transferred with the image is transported to a discharge tray at a top surface of the apparatus body via a fixing unit 9.

After the primary transfer of the toner images to the intermediate transfer belt 71, the photosensitive members 2Y, 2M, 2C, 2K have their the surface potentials reset by unillustrated static eliminators. In addition, the photosensitive members are removed of the toners remaining on their surfaces by means of the cleaners. Then, the photosensitive members are subjected to the subsequent charging by means of the charger units 3Y, 3M, 3C, and 3K.

A transfer belt cleaner 75 is disposed in the vicinity of the roller 72. The cleaner 75 is adapted to be moved into contact with or away from the roller 72 by means of an unillustrated electromagnetic clutch. As moved to the roller 72, the cleaner 75 holds its blade against the surface of the intermediate transfer belt 71 entrained about the roller 72 thereby removing the toner remaining on the outside surface of the intermediate transfer belt 71 after the secondary image transfer.

Figure 2:
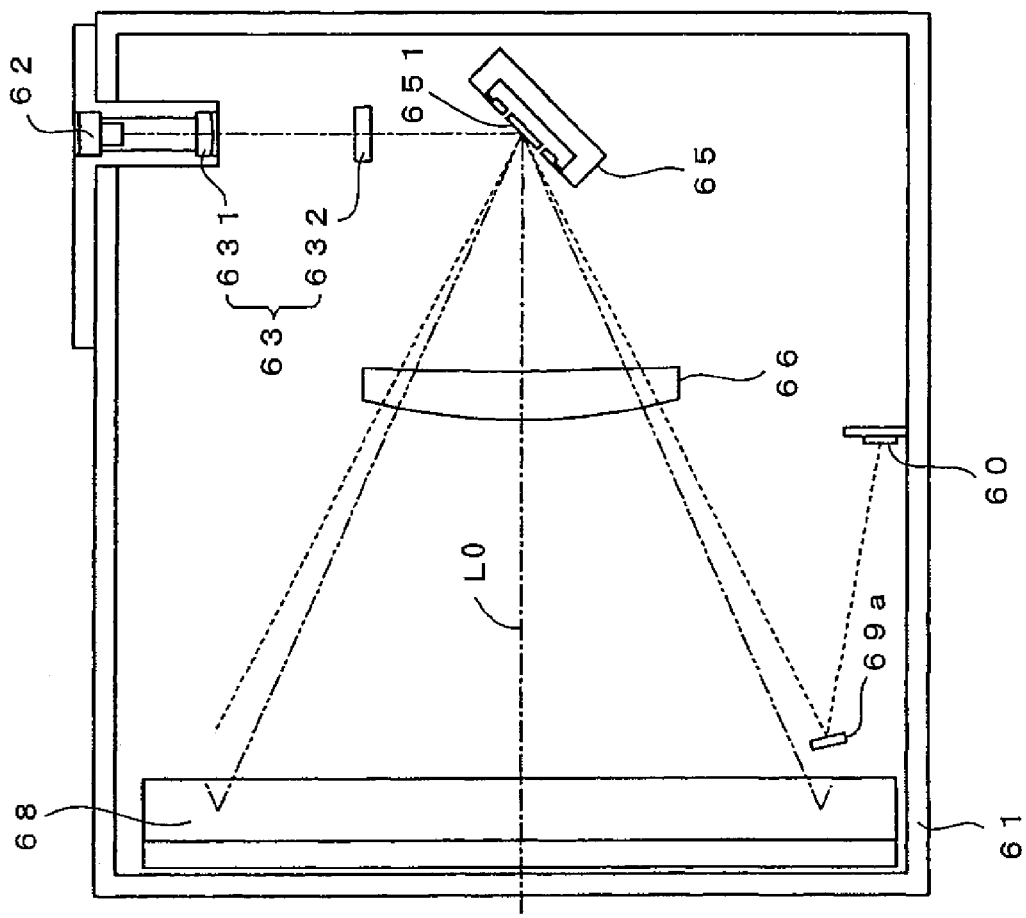
FIG. 2 is a sectional view taken on a main-scan direction for showing an arrangement of an exposure unit according to an embodiment of the present invention.
Figure 3:
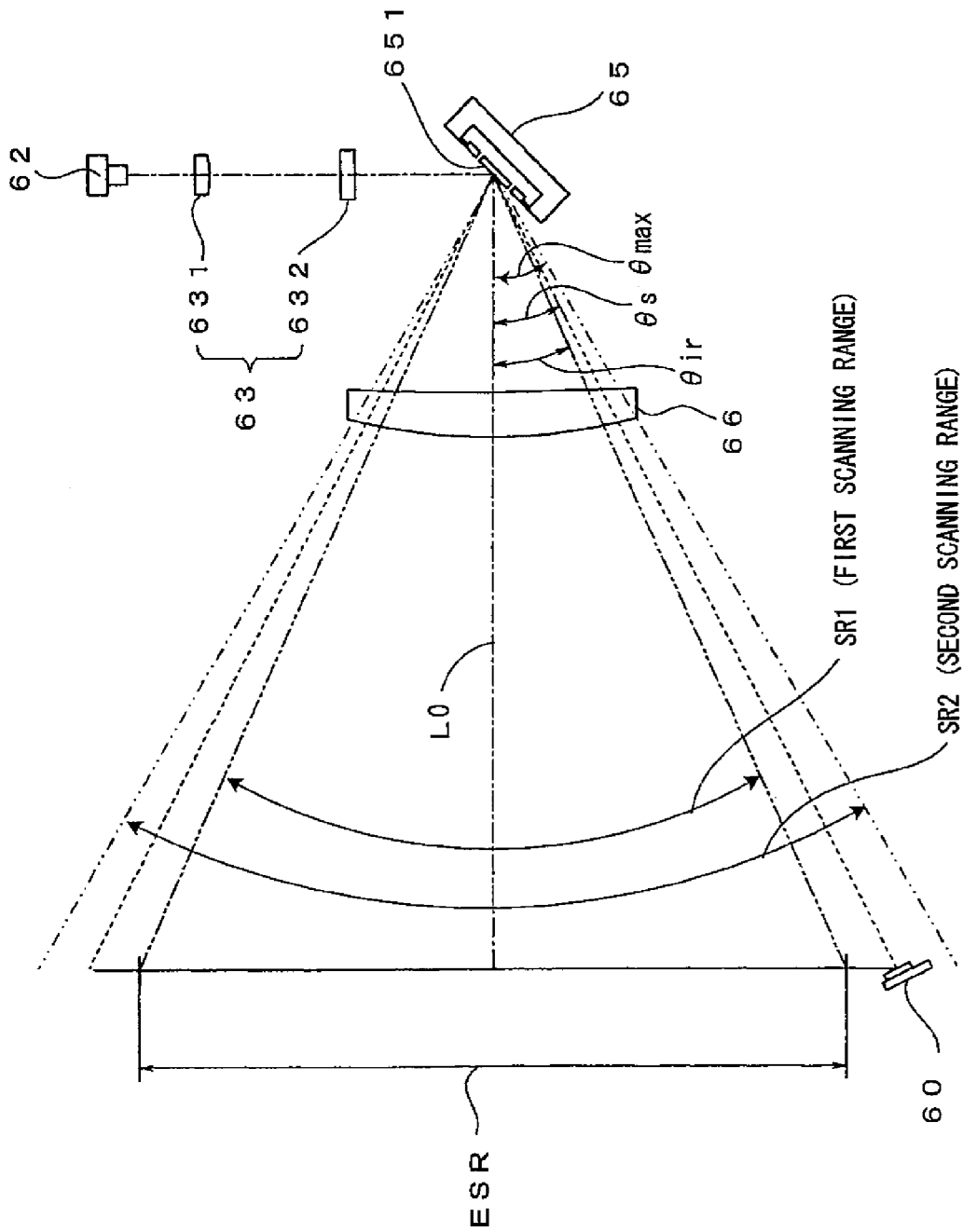
FIG. 3 is a diagram which shows a scanning area in the exposure unit of FIG. 2.
Figure 4:
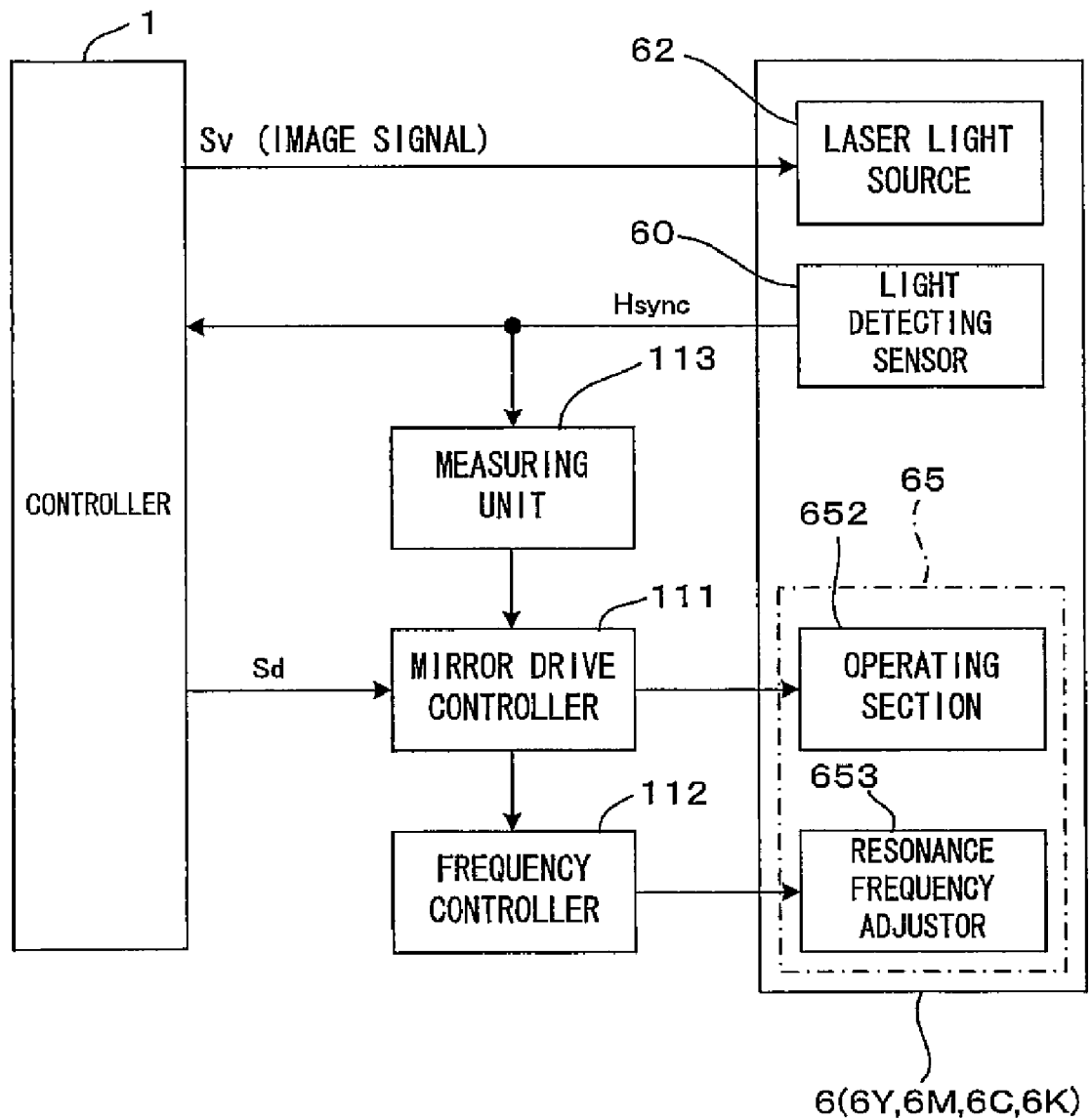
FIG. 4 is a diagram which shows structures of the exposure unit in the apparatus of FIG. 1 and an exposure controller for the purpose of controlling the exposure unit.

FIG. 2 is a sectional view taken on a main-scan direction for showing an arrangement of the exposure unit according to an embodiment of the present invention. FIG. 3 is a diagram which shows a scanning area in the exposure unit (light scanning apparatus) of FIG. 2. FIG. 4 is a diagram which shows the structures of the exposure unit in the apparatus of FIG. 1 and the exposure controller for the purpose of controlling the exposure unit. The structure and operations of the exposure unit 6 and the controller (mirror drive controller 111, frequency controller 112 and measuring unit 113) will now be described in detail with reference to these drawings. It is noted here that the exposure units 6 and the exposure controllers for the respective color components are arranged the same way. Therefore, the arrangement for the yellow color component is described here while individual parts of the arrangements for the other color components are represented by equivalent reference characters, respectively, and the description thereof is dispensed with.

The exposure unit 6Y (6M, 6C, 6K) includes an exposure casing 61. The exposure casing 61 has a single exposure light source 62 fixed thereto so as to be capable of emitting a light beam from the laser light source 62. As shown in FIG. 4, a yellow image signal Sv from the controller 1 is inputted to the laser light source 62. The image signal Sv for yellow is a signal corresponding to yellow image data included in the image forming command. Thus, the laser light source 62 is ON/OFF controlled based on this image signal Sv, so that the laser light source 62 emits a light beam Ly modulated according to the yellow image data.

Within the exposure casing 61, there are provided a collimator lens 631, a cylindrical lens 632, a deflector 65 and a scanning lens 66 for scanning the light beam from the laser light source 62 on the surface of the photosensitive member 2Y. Specifically, the light beam from the laser light source 62 is shaped into a collimated beam of a suitable size by means of the collimator lens 631 and then, is made incident on the cylindrical lens 632 powered only in a sub-scan direction Y. By adjusting the cylindrical lens 631, the collimated beam is focused onto place near a deflecting mirror surface 651 of the deflector 65 with respect to the sub-scan direction Y. According to the embodiment, a combination of the collimator lens 631 and the cylindrical lens 632 functions as a beam shaping system 63 for shaping the light beam from the laser light source 62.

The deflector 65 is formed using a micromachining technique which applies a semiconductor fabrication technique in integrally forming micro machines on a semiconductor substrate. The deflector comprises an oscillation mirror adapted for resonant oscillations. Specifically, the deflector 65 is capable of deflecting the light beam in a main-scan direction X by means of the deflecting mirror surface (oscillation mirror surface) 651 in resonant oscillations. More specifically, the deflecting mirror surface 651 is carried in a manner to be oscillatble about an oscillatory axis (torsion spring) extending perpendicular or substantially perpendicular to the main-scan direction. The deflective mirror oscillates about the oscillatory axis according to an external force applied from an operating section 652. The operating section 652 applies an electrostatic, electromagnetic or mechanical external force to the deflecting mirror surface 651 based on a mirror drive signal from a mirror drive controller 111, thereby causing the deflecting mirror surface 651 to oscillate at a frequency of the mirror drive signal. The operating section 652 may adopt any of the drive methods based on electrostatic attraction, electromagnetic force and mechanical force. These drive methods are known in the art and hence, the description thereof is dispensed with.

The deflector 65 driven in this manner is provided with a resonant-frequency adjustor 653 as disclosed in Japanese Unexamined Patent Publication JP-A-9-197334, for example. Thus, the deflector 65 is adapted to vary the resonant frequency thereof. This resonant-frequency adjustor 653 includes an electrical resistance element formed at the torsion spring (not shown) of the deflector 65. The electric resistance element is electrically connected with a frequency controller 112 of the exposure controller. The frequency controller 112 controls power supply to the electrical resistance element so as to vary the temperature of the torsion spring. Thus, the spring constant of the torsion spring is varied so that the resonant frequency of the deflector 65 can be varied. In this embodiment, the resonant frequency of the deflector 65 functions as a drive controlled variable and is adjusted to control the angle of amplitude of the deflecting mirror surface 651. Hence, in a case where the resonant frequency does not coincide with the frequency of the mirror drive signal, the embodiment operates the resonant-frequency adjustor 653 to vary the resonant frequency of the deflector 65 for substantially matching the resonant frequency with the drive frequency. It is noted that a specific arrangement for varying the resonant frequency of the deflector 65 is not limited to this, and any conventionally known arrangement may be adopted.

The mirror drive controller 111 can be reprogrammed to change the drive controlled variable, i.e., drive conditions including the frequency, voltage and the like of the mirror drive signal. As will be described hereinlater, the mirror driver can be reprogrammed to change the frequency of the mirror drive signal as circumstance demand. The mirror driver is also adapted to adjust an amplitude value by changing the voltage of the mirror drive signal.

The light beam deflected by the deflection mirror surface 651 of the deflector 65 heads toward a scanning lens 66. In this embodiment, the scanning lens 66 is structured so that its F-value remains approximately the same across all of an effective scanning region ESR of a photosensitive member 2. Hence, the light beam deflected toward the scanning lens 66 is imaged via the scanning lens 66 as spots having approximately identical diameters within the effective scanning region ESR of the photosensitive member 2. In this manner, as the light beam scans parallel to the main scanning direction X, a latent image shaped like a line elongating in the main scanning direction X is formed in the effective scanning region ESR on the photosensitive member 2. In this embodiment, a scanning area SR2 is made scannable by the deflector 65 (the "second scanning area" of the invention). The area SR2 is wider than a scanning area SR1 within the effective scanning region ESR where the light beam scans (the "first scanning area" of the invention) as shown in FIG. 3. The first scanning area SR1 is located approximately at the center of the second scanning area SR2, and is approximately symmetrical with respect to an optical axis L0. In FIG. 4, the symbol θir denotes the angle of amplitude of the deflection mirror surface 651 corresponding to the edges of the effective scanning region ESR. And the symbol θs denotes the angle of amplitude of the deflection mirror surface 651 corresponding to horizontal synchronization sensors which will be described next.

Further, in this embodiment, as shown in FIG. 2, a return mirror 69a guides the scanning light beam to a light detecting sensor 60 at the one end of the scanning path of the scanning light beam. The return mirror 69a is disposed at the one edge of the second scanning area SR2 and within the second scanning area SR2, guides the scanning light beam to the light detecting sensor 60 whenever the scanning light beam exits the first scanning area SR1. Receiving the scanning light beam, the light detecting sensor 60 outputs a signal upon arrival of the scanning light beam at the sensor position (the angle of amplitude θs).

The detection signal Hsync indicative of the scanning light beam detected by this light detecting sensor 60 is transmitted to a measuring unit 113 of the exposure controller. The measuring unit 113 calculates drive information related to the angle of amplitude of the deflector 65, the scanning time and the drive cycle in which the light beam scans the effective scanning region ESR, etc. The mirror drive controller 111 receives actual measurement information thus calculated by the measuring unit 113. The mirror drive controller 111 performs amplitude control, adjusts the resonance frequency of the deflector 65 using a frequency controller 112 and stops driving the mirror as described later.

Further, the detection signal Hsync from the light detecting sensor 60 is fed also to the controller 1 directly, and functions as a synchronizing signal for the light beam to scan the effective scanning region ESR in the main scanning direction X. In other words, the sensor 60 functions as a horizontal synchronization reader sensor for obtaining the horizontal synchronizing signal Hsync.

By the way, in the apparatus having the structure described above, upon receipt of an image forming command while the deflector 65 halting, start-up processing is executed before starting to form an image to attain adjustment. As a result, the deflector 65 will make the light beam scan favorably in synchronization to the controller 1. The start-up processing according to this embodiment will now described with reference to FIGS. 5 through 8.

Figure 5:
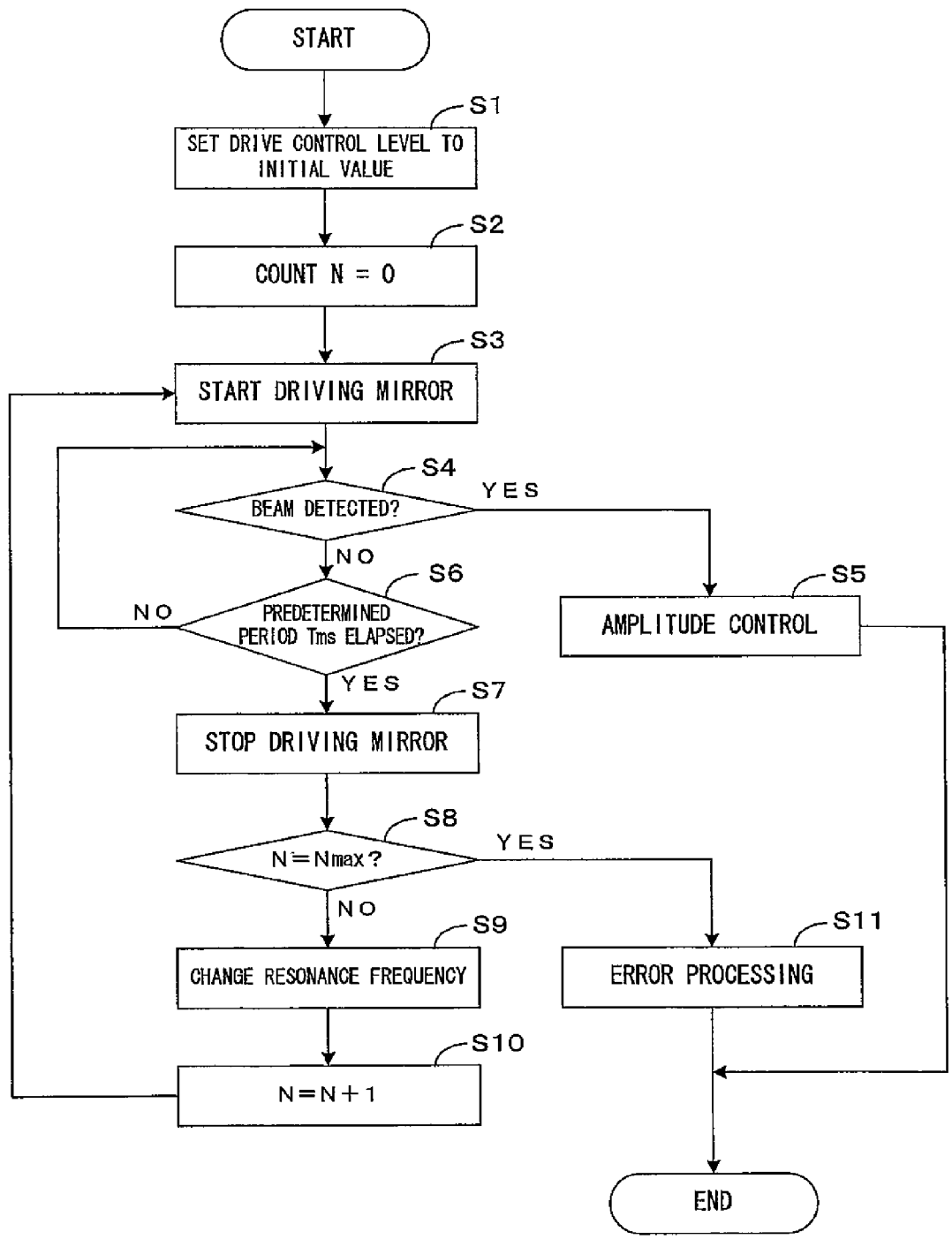
FIG. 5 is a flow chart of a start-up processing which is executed in the image forming apparatus of FIG. 1.

FIG. 5 is a flow chart of the start-up processing which is executed in the image forming apparatus which is shown in FIG. 1. As the illustrated start-up processing commences, at Step S1, the drive control variable for activating the deflector 65 is set to an initial value which has been stored in memory (not shown) in advance. Describing in more specific details, the electric characteristic values (the frequency, the voltage, the current, etc.) of the mirror drive signal and a signal which is fed to a resonance frequency adjustor 653 are read out from the memory and set. Further, a count N representative of the number of times that resonance frequency change which will be described later is repeated is reset (Step S2).

Figure 6:
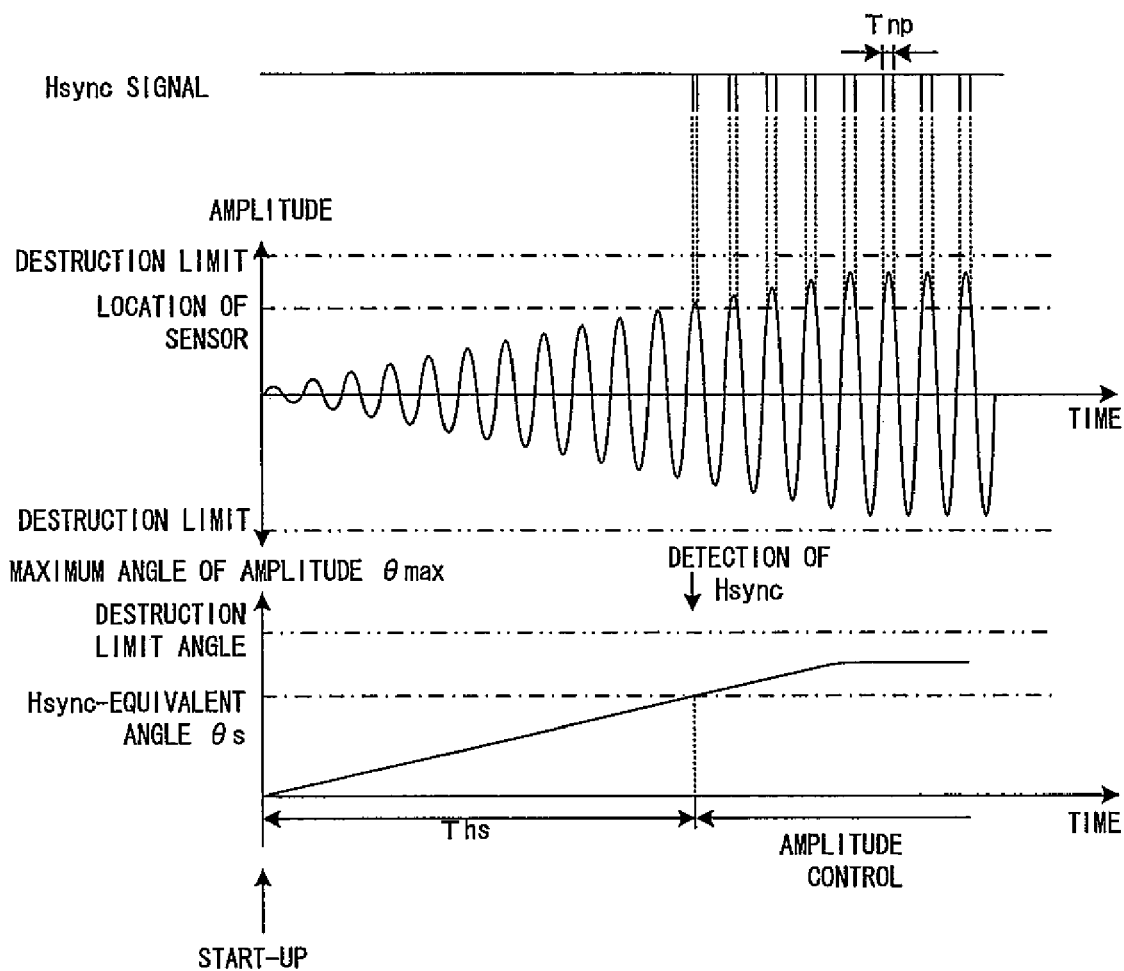
FIG. 6 is a diagram which shows a basic operation during the start-up processing.
Figure 8:
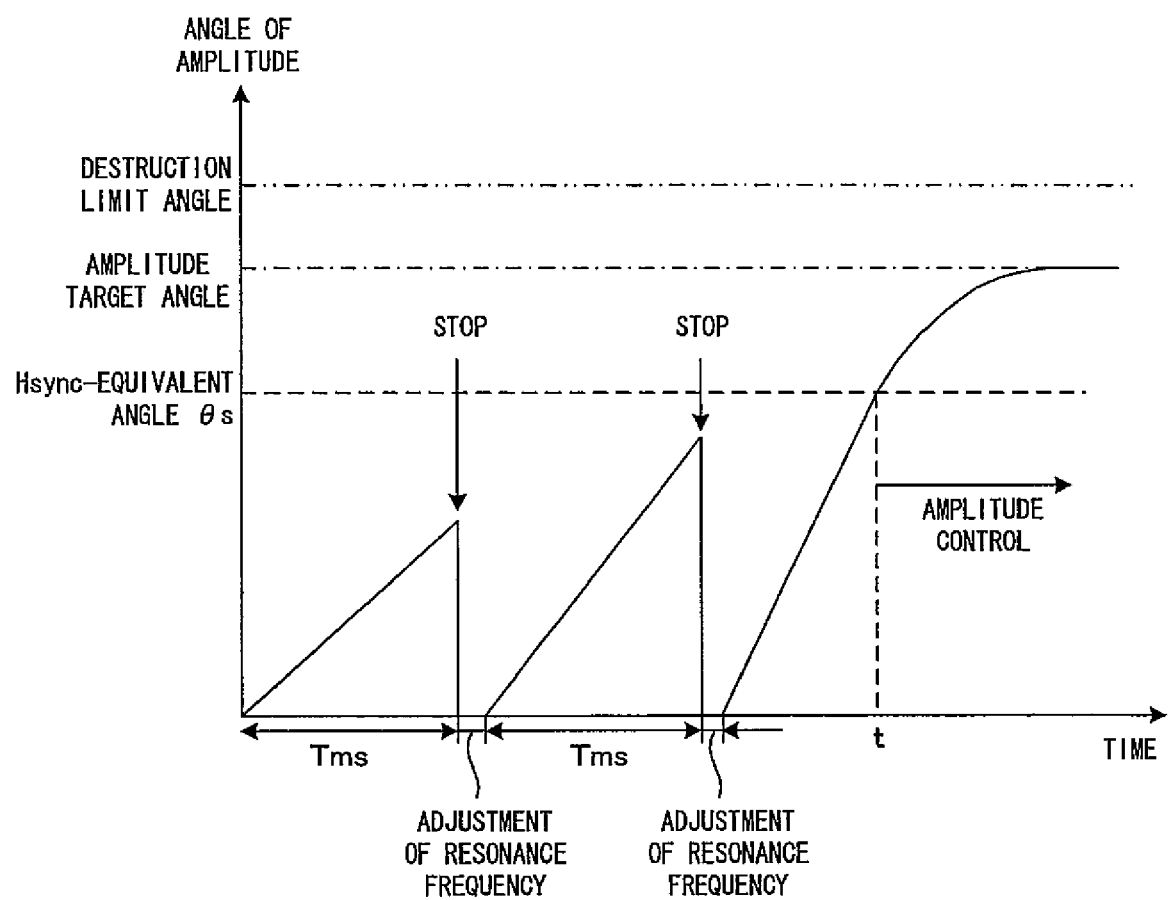
FIG. 8 is a diagram which shows an example of the start-up processing executing by the image forming apparatus of FIG. 1.

Upon completion of the initial setting, the mirror is started to be driven with these initial values described above (Step S3). At this stage, the amplitude of the deflector 65 gradually increases from zero as shown in FIG. 6 for example. The light detecting sensor 60 outputs the signal Hsync when the angle of amplitude reaches an angle $\theta$s which corresponds to Hsync, i.e., when the scanning light beam moves passed the light detecting sensor 60. This establishes confirmation of emission of the light beam from the laser source 62 and makes it possible to perform amplitude control based on the output signal Hsync from the light detecting sensor 60. In this embodiment therefore, whether the light detecting sensor 60 has detected the light beam is determined after starting to drive the mirror (Step S4).

When "YES" at Step S4, the sequence proceeds to Step S5 at which amplitude control is executed. This embodiment requires performing amplitude control based on a output timing gap Tnp between two signals Hsync which the light detecting sensor 60 outputs successively during a short period of time. That is, in the apparatus which uses the deflector 65 formed by an oscillation mirror, when the light beam scanning away from the effective scanning region ESR moves passed the light detecting sensor 60, the first detection signal Hsync is output. The deflecting mirror surface 651 turning around at the maximum angle of amplitude $\theta$max then reverses the scanning direction of the scanning light beam. The scanning light beam moves toward the effective scanning region ESR, and when it moves passed the location of the sensor (the angle $\theta$s which corresponds to Hsync), the light detecting sensor 60 outputs the second detection signal Hsync. The output timing gap Tnp between the first detection signal Hsync and the second detection signal Hsync is relevant to the maximum angle of amplitude $\theta$max, namely, the amplitude of the deflector 65 as it is at the time of detection of the Hsync signals. In light of this, this embodiment requires that the measuring unit 113 calculates the output-timing gap between the first and the second detection signals as amplitude-related information relevant to the angle of amplitude. Then the measuring unit 113 feeds this information to the mirror drive controller 111. The mirror drive controller 111, based on the amplitude-related information received from the measuring unit 113 and an amplitude target value fed from the controller 1, adjusts the voltage, the current and the like of the mirror drive signal which is provided to the operating section 652. A specific method of amplitude control is not limited to this. Instead, conventional amplitude control may be performed.

On the contrary, when "NO" at Step S4, the sequence proceeds to Step S6 at which whether the elapsed time from the start of the driving has reached a predetermined period Tms is judged. Long as the elapsed time has not reached the period Tms yet, the sequence returns to Step S4. That is, this embodiment waits for the signal output from the light detecting sensor 60 until the predetermined period Tms elapses since the start of the driving of the mirror. As described above, amplitude control is performed upon the signal output (Step S5), but without the signal output, the mirror drive controller 111 stops outputting the mirror drive signal to the operating section 652 and stops driving the mirror (Step S7).

The reason of adding Step S6 will now be described in detail with reference to FIGS. 6, 7A and 7B. At the start of driving of the deflector 65, the amplitude of the deflector 65 is small. Whichever value to which the initial value is set, a certain time Ths is necessary for the amplitude of the resonating deflector 65 to become the Hsync-equivalent angle $\theta$s. It is therefore ideal to set the predetermined period Tms to the time Ths or longer. For instance, the predetermined period Tms may be the time Ths which is the period of time until the first outputting of the signal Hsync from the light detecting sensor 60 after driving of the deflector 65 with the initial values has started.

By the way, according to this embodiment, the electric characteristic values (the frequency, the voltage, the current, etc.) of the signal fed to the resonance frequency adjustor 653 are set to the initial values. Therefore, the resonance frequency of the deflector 65 will approximately coincide with the frequency of the mirror drive signal, namely, the drive frequency. However, there may be an instance that the resonance frequency is off the drive frequency due to disturbance such as an environment surrounding the apparatus. In that instance, as shown in FIG. 7A for instance, even when the deflector 65 has a stable amplitude, the maximum angle of amplitude $\theta$max of the deflector 65 may be smaller than the Hsync-equivalent angle $\theta$s. When that is the situation, the judgment at Step S6 is "NO" and the driving of the mirror is stopped (Step S7).

The foregoing has described the problem which arises when the maximum angle of amplitude $\theta$max is small as a result of driving with the initial values. Even when the maximum angle of amplitude $\theta$max is large, a problem may occur as shown in FIG. 7B for example. While the operation is normal under that condition, there will not be any particular problem. In the normal condition, the laser light source 62 is emitting the light beam and the light detecting sensor 60 is operating normally. Hence, the light detecting sensor 60 will detect the light beam after the time Ths and amplitude control will start, thereby suppressing the amplitude of the deflector 65 to the amplitude target value. However, a trouble such as failed outputting of the detection signal Hsync from the light detecting sensor 60 due to malfunction of the laser light source 62, the light detecting sensor 60 or owing to a noise gives rise to the following problem. That is, although the maximum angle of amplitude $\theta$max of the deflector 65 is already equal to or larger than the Hsync-equivalent angle $\theta$s, the light detecting sensor 60 won't output its signal. As a result, as time elapses, the maximum angle of amplitude $\theta$max grows gradually, and the deflector 65 gets destroyed when the maximum angle of amplitude $\theta$max exceeds the destruction limit angle. For prevention of this, it is ideal to set the predetermined period Tms to shorter than a time Tds. The time Tds is the time necessary for the maximum angle of amplitude $\theta$max to reach the destruction limit angle after driving of the deflector 65 with the initial values has started. In this embodiment therefore, the predetermined period Tms is set to the time Ths or longer but shorter than the time Tds.

The description will be continued with reference back to FIG. 5 again. As the driving of the mirror is stopped at Step S7, whether the count N has reached a maximum repeat count Nmax (which is a natural number equal to or larger than 1) is then determined (Step S8). This is to deal with a situation that the drive frequency does not coincide with the resonance frequency as shown in FIG. 7A. In other words, as long as "NO" at Step S8, Steps S9 and S10 are executed and then the sequence returns to Step S3 and driving of the mirror is started once again. The signal fed to the resonance frequency adjustor 653 from the frequency controller 112 is controlled to change the resonance frequency of the deflector 65 (Step S9), and thereafter, incrementing the count N only by one (Step S10). Repeated changes of the resonance frequency for the maximum repeat count Nmax matches the drive frequency with the resonance frequency. In the example shown in FIG. 8 for instance, the resonance frequency is changed twice while the drive frequency is fixed. As a result, the resonance frequency becomes approximately the same as the drive frequency and the light detecting sensor 60 outputs the detection signal Hsync at the time t. Amplitude control is performed at and after the time t, whereby the angle of amplitude of the deflector 65 is adjusted to an amplitude target angle.

Meanwhile, when the light detecting sensor 60 does not detect the light beam even after resonance frequency changes for the maximum repeat count Nmax, i.e., "YES" at Step S8, predetermined error processing is executed (Step S11). During the error processing, a display section (not shown) of the controller 1 for instance may show a message, a code or the like which describes abnormality in the exposure unit 6 and informs a user of the trouble.

As described above, in this embodiment, driving of the deflector 65 is stopped when the light beam is not detected even after the predetermined period Tms from the start of the driving of the deflector (oscillation mirror) 65. Accordingly, it is possible to prevent destruction of the deflector 65 without fail. In other words, according to this embodiment, even despite a trouble with the light source 62, the light detecting sensor 60, etc., it is possible to disable the deflector 65 without fail before the deflector 65 gets destroyed.

Further, even when no light beam is detected during the predetermined period Tms, detection is tried again after changing the resonance frequency. Therefore, it is possible to approximately match the resonance frequency with the drive frequency and vibrate the deflector 65 at the amplitude target value. In addition, stopping the deflector 65 while changing the resonance frequency brings about the following effect as well. That is, the amplitude of the deflector 65 may be relatively small at the time of "YES" at Step S6 due to a discrepancy between the resonance frequency and the drive frequency. In this case, the resonance frequency is matched with the drive frequency through resonance frequency changes with the mirror remaining driven. This matching process causes the amplitude of the deflector 65 greatly increase. As a result, the amplitude of the deflector 65 may excessively go beyond the amplitude target angle, in which case amplitude control will need a long time. In addition, it is not possible when "YES" at Step S6 to determine whether the reason why the light beam is not detected is a discrepancy between the drive frequency and the resonance frequency (as shown in FIG. 7A) or a trouble with the light source 62, the light detecting sensor 60 or the like (as shown in FIG. 7B). Hence, if the resonance frequency is simply changed with the mirror driven in a condition that the deflector 65 is still driving at a relatively large amplitude when "YES" at Step S6, the amplitude of the deflector 65 could increase significantly and exceed the destruction limit angle. In contrast, re-driving the mirror after temporarily stopping the mirror securely obviates these problems.

Second Embodiment

While amplitude control is performed normally, the output timing gap Tnp between the first and the second detection signals is approximately constant and the maximum angle of amplitude $\theta$max is at the amplitude target value. However, if the mirror drive controller 111 feeds an improper mirror drive signal to the operating section 652 of the deflector 65 under the influence of a noise or disturbance, the angle of amplitude of the deflector 65 could significantly change. The influence of a noise or the like in particular may vibrate the deflector 65 further. Noting this, the second embodiment requires monitoring a change of the amplitude of the deflector 65, and upon confirmation of an abnormal operation (which is an amplifying operation that the maximum angle of amplitude $\theta$max grows toward the destruction limit angle), stopping driving of the deflector 65. This will now be described in detail with reference to FIGS. 9, 10A and 10B. The basic structure of the apparatus according to the second embodiment and a third embodiment described later is the same as that according to the first embodiment, and therefore will not be described in redundancy but will be referred to by the same reference symbols.

Figure 9:
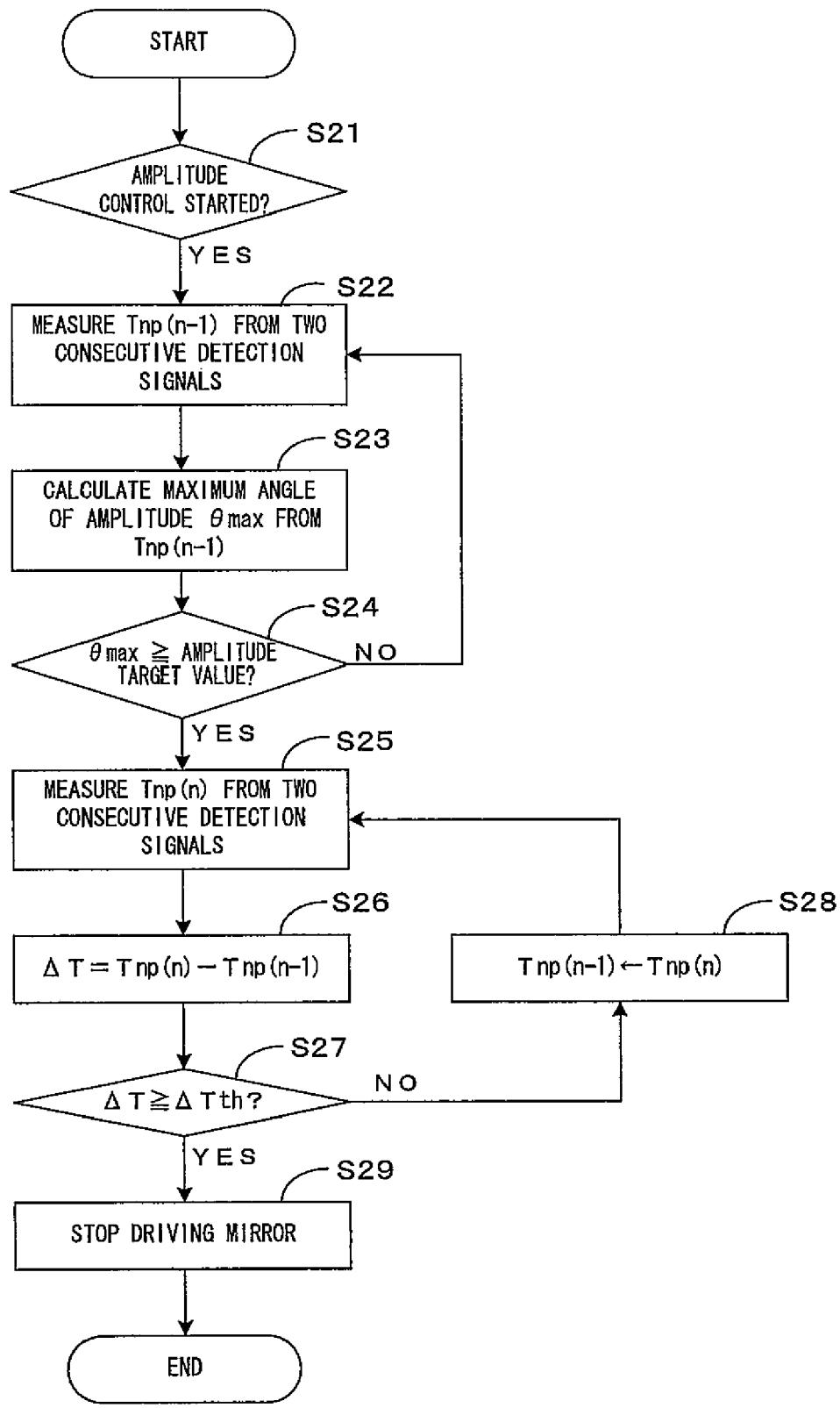
FIG. 9 is a flow chart which shows an operation of an exposure unit according to a second embodiment.

FIG. 9 is a flow chart which shows an operation of the exposure unit according to the second embodiment. FIGS. 10A and 10B are drawings which show how the amplitude of the deflector changes and the state in which the detection signal is output. In this embodiment, upon confirmation that amplitude control has started in the manner described above (Step S21), the measuring unit 113 calculates a output timing gap Tnp(n−1) between two consecutive detection signals Hsync which are output as the reciprocal light beam moves passed the light detecting sensor 60 (Step S22). The mirror drive controller 111 then calculates the maximum angle of amplitude $\theta$max of the reciprocal light beam from the amplitude-related information Tnp(n−1) received from the measuring unit 113 (Step S23). Whether the maximum angle of amplitude $\theta$max is equal to or larger than the amplitude target value is determined (Step S24). While it is "NO" at Step S24, the sequence returns back to Step S22 to calculate the output timing gap Tnp(n−1) between the detection signals Hsync and the maximum angle of amplitude $\theta$max during the next oscillation cycle.

On the contrary, when "YES" at Step S24, monitoring of a change of the amplitude of the deflector 65 starts. That is, a output timing gap Tnp(n) between the detection signals Hsync during the next oscillation cycle is calculated in a similar manner to that at Step S22 described above (Step S25). A difference $\Delta$T between the output timing gap Tnp(n) during the current oscillation cycle and the output timing gap Tnp(n−1) during the immediately precedent oscillation cycle is then calculated (Step S26). The difference $\Delta$T corresponds to a difference $\Delta\theta$max between the maximum angle of amplitude $\theta$max(n) during the current oscillation cycle and the maximum angle of amplitude $\theta$max(n−1) during the immediately precedent oscillation cycle. In other words, the difference $\Delta$T means a gain which is indicative of the rate at which the maximum angle of amplitude $\theta$max of the deflector 65 grows from one oscillation cycle to the next. For example, when the difference $\Delta$T is zero, as shown in FIG. 10A, amplitude control is executed favorably and the maximum angle of amplitude $\theta$max remains at an approximately constant value. On the contrary, when the amplitude changes as shown in FIG. 10B for instance due to the influence of a noise or the like, the difference $\Delta$T is equal to or larger than zero and the maximum angle of amplitude $\theta$max grows as time elapses.

Considering this, this embodiment requires judging whether the difference $\Delta$T is equal to or larger than a predetermined critical value $\Delta$th, i.e., whether the gain of the maximum angle of amplitude $\theta$max is large and the maximum angle of amplitude $\theta$max becomes close to the destruction limit angle (Step S27). While "NO" at Step S27, it is decided that there is no change of the amplitude of the deflector 65 or a change is within a tolerable range. Thereafter, the current output timing gap Tnp(n) is rewritten to the immediately previous output timing gap Tnp(n−1), and the sequence returns back to Step S25. The gain is thus calculated for each oscillation cycle and a change of the amplitude of the deflector 65 is monitored based on the gain.

The difference ΔT (=Tnp(n)−Tnp(n−1)) may grow and reach or exceed the critical value Δth and the deflector 65 is confirmed to be in an abnormal operation (an operation leading to destruction of the mirror) during the monitoring as shown in FIG. 10B, for example. At the time, the mirror drive controller 111 stops outputting the mirror drive signal to the operating section 652 and stops driving the mirror (Step S29).

As described above, in this embodiment, a change of the amplitude of the deflector 65 is monitored based on the output signal Hsync from the light detecting sensor 60. Further the mirror drive controller 111 confirms the abnormal operation that the maximum angle of amplitude of the deflector 65 rises toward such an angle of amplitude which leads to destruction of the mirror, namely, the destruction limit angle, The driving of the deflector 65 is stopped immediately after confirmation of the abnormal operation. It is therefore possible to stop driving the mirror and securely prevent destruction of the deflector 65 even when the operating section 652 of the deflector 65 receives an improper mirror drive signal due to a noise, disturbance, etc.

The embodiment above requires use of the output timing gap Tnp(n−1) during the immediately precedent oscillation cycle for calculation of ΔT which corresponds to the gain during the current oscillation cycle. An output timing gap Tnp(m) during a few oscillation cycles before (where m is (n−2), (n−3), . . . ) may be additionally used. In addition, although the embodiment above requires monitoring a change of the amplitude after the maximum angle of amplitude θmax has reached the amplitude target value, amplitude change monitoring may start when amplitude control starts.

Third Embodiment

Figure 11:
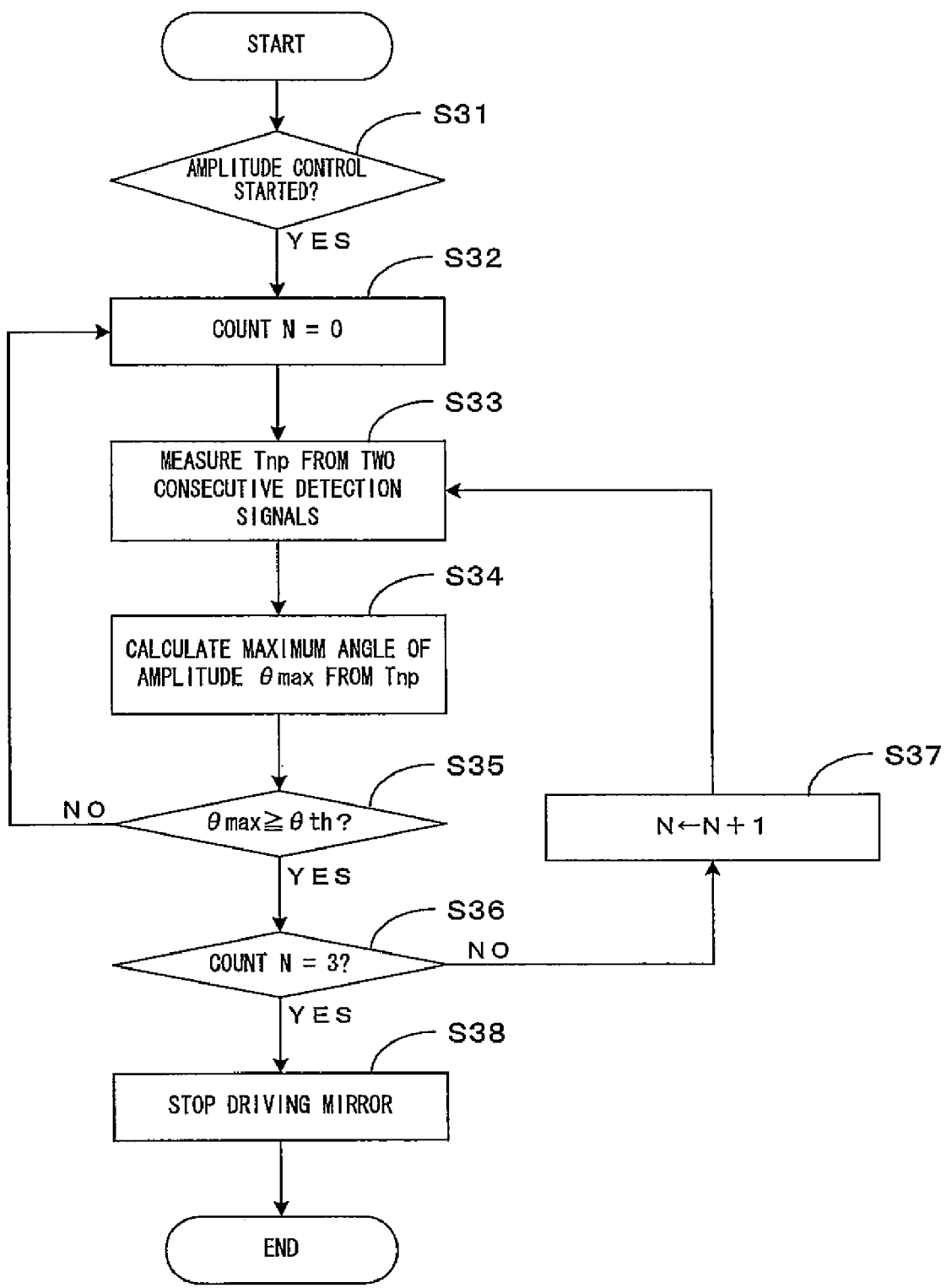
FIG. 11 is a flow chart which shows an operation according to a third embodiment.
Figure 12:
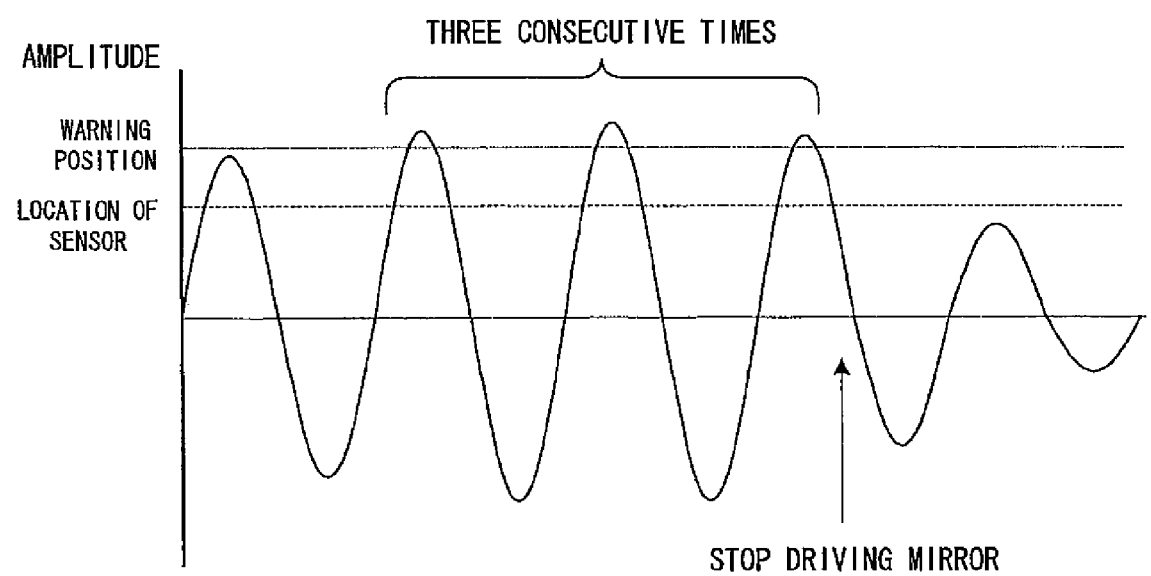
FIG. 12 is a drawing of the operation according to the third embodiment.

FIG. 11 is a flow chart which shows an operation according to the third embodiment of the light scanning apparatus of the invention. FIG. 12 is a drawing of the operation according to the third embodiment. A major difference of the third embodiment from the second embodiment (FIG. 9) is at the criterion regarding the abnormal operation. In the third embodiment, when the maximum angle of amplitude θmax has exceeded a predetermined angle of amplitude for a pre-set number of times N (which is a natural number equal to or larger than 2) in a row, the abnormal operation is confirmed. The structure is otherwise the same basically. The third embodiment will now be described with reference to FIGS. 11 and 12.

In this embodiment, upon confirmation of the start of amplitude control (Step S31), the count N is reset to zero (Step S32). The measuring unit 113 then calculates a output timing gap Tnp between two consecutive detection signals Hsync which are output as the reciprocal light beam moves passed the light detecting sensor 60 (Step S33). The output timing gap Tnp corresponds to the maximum angle of amplitude θ and functions as a amplitude-related information. Consequently, the mirror drive controller 111 calculates the maximum angle of amplitude θmax of the reciprocal light beam from the amplitude-related information Tnp received from the measuring unit 113 (Step S34). Thereafter, whether the maximum angle of amplitude θmax is equal to or larger than a value θth set in advance is determined (Step S35). The setting value θth may be set to a value which exceeds the amplitude target value but is smaller than the destruction limit angle. In FIG. 12, "WARNING POSITION" is a location which corresponds to the setting value θth.

While "NO" at Step S35, the sequence returns back to Step S32 described above, thereby resetting the count N and calculating the output timing gap Tnp and the maximum angle of amplitude θmax during the next oscillation cycle. Meanwhile, when "YES" at Step S35, whether the count N has reached 3 is determined (Step S36). When "NO", the sequence returns back to Step S33 after incrementing the count N only by one at Step S37. Hence, the output timing gap Tnp between the detection signals Hsync and the maximum angle of amplitude θmax during the next oscillation cycle are calculated and whether the maximum angle of amplitude θmax is equal to or larger than the pre-set value θth is determined.

On the contrary, when "YES" at Step S36, that is, when oscillations are ongoing with the maximum angle of amplitude θmax beyond the warning position three consecutive times as shown in FIG. 12, it is confirmed that the deflector 65 is abnormally operating (so that the mirror will be destroyed). The mirror drive controller 111 in response stops outputting the mirror drive signal to the operating section 652 and stops driving the mirror (Step S38).

As described above, this embodiment as well achieves similar effects to those according to the earlier embodiments. That is, by means of monitoring of a change of the amplitude of the deflector 65 based on the output signal Hsync from the light detecting sensor 60, it is possible to confirm the abnormal operation that the maximum angle of amplitude of the deflector 65 rises toward such an angle of amplitude leading to destruction of the mirror, namely, the destruction limit angle. The driving of the deflector 65 is stopped immediately after confirmation of the abnormal operation. It is therefore possible to stop driving the mirror and securely prevent destruction of the deflector 65 even when the operating section 652 of the deflector 65 receives an improper mirror drive signal due to a noise, disturbance, etc.

The invention is not limited to the embodiments described above but may be modified in various manners in addition to the embodiments above, to the extent not deviating from the object of the invention. The embodiments above are directed to an application of the invention to a light scanning apparatus which detects a light beam at one end of the second scanning range SR2 and executes amplitude control. The invention is applicable also to an apparatus which detects a light beam at the other end and executes amplitude control. The invention is further applicable to an apparatus which detects a light beam at the both ends of the second scanning range SR2, between which the effective scanning region ESR is located, and executes amplitude control.

Further, although the embodiments described above use the resonance frequency adjustor 653 which utilizes a change of a spring constant associated with a temperature change, the structure of the resonance frequency adjustor 653 is not limited to this. Instead, the resonance frequency can be adjusted by a conventional method. In addition, adjustment of the resonance frequency itself is not an essential and indispensable element constituting the invention. It is preferable however to adjust the resonance frequency when needed as described above.

Further, although the embodiments above are directed to an application of the light scanning apparatus of the invention to an exposure unit of a tandem-type color image forming apparatus, the invention is not limited to this application. The invention is applicable also to an exposure unit of a color image forming apparatus of the so-called 4-cycle type or that of a monochrome image forming apparatus which forms unicolor images. Still further, the light scanning apparatus is not applicable only to an exposure unit which an image forming apparatus comprises. The invention is generally applicable to any light scanning apparatus which makes a light beam; scan on a surface-to-be-scanned.

Further, although the embodiments described above use as an oscillation mirror the deflector 65 which is formed using a micromachining technique, the invention is generally applicable to a light scanning apparatus which deflects a light beam using an oscillation mirror which resonates and makes the light beam scan.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A light scanning apparatus which makes a light beam scan along a main scanning direction on an effective scanning region which has a predetermined width, comprising:
    a light source which emits the light beam;
    a deflector which includes an oscillation mirror which oscillates about an oscillatory axis which is orthogonal or approximately orthogonal to the main scanning direction, deflects the light beam emitted from the light source using the oscillation mirror, and makes the light beam scan a second scanning range which contains but extends beyond a first scanning range which corresponds to the effective scanning region;
    a detector which detects the scanning light beam which moves through a position which is outside the first scanning range but is within the second scanning range, and outputs a signal; and
    a controller which controls a mirror drive signal fed to the oscillation mirror based on the output signal from the detector and accordingly adjusts an amplitude of the oscillation mirror,
    wherein the controller detects a change of the amplitude of the oscillation mirror in accordance with the output signal and stops driving the oscillation mirror when the change of the amplitude of the oscillation mirror exceeds a value determined in advance.

2. The light scanning apparatus of claim 1, wherein the controller detects a change of the amplitude of the oscillation mirror in accordance with the output signal which the detector outputs when detecting a reciprocal light beam which moves from the effective scanning region via the detector and returns back to the effective scanning region via the detector.

3. The light scanning apparatus of claim 2, wherein the controller calculates a gain, and when the calculated gain exceeds a critical value determined in advance, the controller stops driving the oscillation mirror, the gain representing an increasing rate at which the maximum angle of amplitude of the oscillation mirror increases in each oscillation cycle of the oscillation mirror based on the output signal which the detector outputs in synchronization to the oscillation cycles of the oscillation mirror.

4. The light scanning apparatus of claim 3, wherein the gain is calculated by taking the difference between an output timing gap of a current oscillation cycle and an output timing gap of an immediately preceding oscillation cycle.

5. The light scanning apparatus of claim 4, wherein the difference between the output timing gaps of consecutive oscillation cycles corresponds to a difference between a maximum angle of amplitude of the consecutive oscillation cycles.

6. The light scanning apparatus of claim 1, further comprising:
    a measuring unit that calculates an output timing gap based on consecutive output signals which the detector outputs when detecting a reciprocal light beam which moves from the effective scanning region via the detector and returns back to the effective scanning region via the detector.

7. The light scanning apparatus of claim 6, further comprising:
    a mirror drive controller that calculates a maximum angle of amplitude according to the output timing gap calculated by the measuring unit.

8. The light scanning apparatus of claim 7, wherein the controller detects a change of the amplitude of the oscillation mirror when the maximum angle of amplitude is equal to or larger than a pre-determined value.

9. An apparatus for forming an image, comprising:
    a latent image carrier which has an effective scanning region which has a predetermined width along a main scanning direction;
    an exposure unit which scans a light beam on the effective scanning region so as to form a latent image;
    an exposure controller which controls the exposure unit; and
    a developing unit which develops the latent image with toner to form a toner image, wherein
    the exposure unit includes: a light source which emits the light beam; a deflector which has an oscillation mirror which oscillates about an oscillatory axis which is orthogonal or approximately orthogonal to the main scanning direction, deflects the light beam emitted from the light source using the oscillation mirror, and makes the light beam scan a second scanning range which contains but extends beyond a first scanning range which corresponds to the effective scanning region; and a detector which detects the scanning light beam which moves through a position which is outside the first scanning range but is within the second scanning range, and outputs a signal,
    the exposure controller controls a mirror drive signal fed to the oscillation mirror based on the output signal from the detector and accordingly adjusts an amplitude of the oscillation mirror, and
    the exposure controller detects a change of the amplitude of the oscillation mirror in accordance with the output signal and stops driving the oscillation mirror when the change of the amplitude of the oscillation mirror exceeds a value determined in advance.

10. The apparatus for forming an image according to claim 9, wherein the exposure controller calculates a gain, and when the calculated gain exceeds a critical value determined in advance, the exposure controller stops driving the oscillation mirror, the gain representing an increasing rate at which the maximum angle of amplitude of the oscillation mirror increases in each oscillation cycle of the oscillation mirror based on the output signal which the detector outputs in synchronization to the oscillation cycles of the oscillation mirror.

11. The apparatus for forming an image according to claim 10, wherein the gain is calculated by taking the difference between an output timing gap of a current oscillation cycle and an output timing gap of an immediately preceding oscillation cycle.

12. The apparatus for forming an image according to claim 11, wherein the difference between the output timing gaps of consecutive oscillation cycles corresponds to a difference between a maximum angle of amplitude of the consecutive oscillation cycles.

13. The apparatus for forming an image according to claim 9, further comprising:
- a measuring unit that calculates an output timing gap based on consecutive output signals which the detector outputs when detecting a reciprocal light beam which moves from the effective scanning region via the detector and returns back to the effective scanning region via the detector.

14. The apparatus for forming an image according to claim 13, further comprising:
- a mirror drive controller that calculates a maximum angle of amplitude according to the output timing gap calculated by the measuring unit.

15. The apparatus for forming an image according to claim 14, wherein the exposure controller detects a change of the amplitude of the oscillation mirror when the maximum angle of amplitude is equal to or larger than a pre-determined value.

16. A method of controlling a light scanning apparatus, which deflects a light beam from a light source along a main scanning direction using an oscillation mirror which resonates and makes the light beam scan on an effective scanning region, according to which while the oscillation mirror is driven so that the light beam scans a second scanning range which contains but extends beyond a first scanning range corresponding to the effective scanning region, a detector detects this scanning light beam which moves past a position which is within the second scanning range but outside the first scanning range, a mirror drive signal fed to the oscillation mirror is controlled in accordance with a signal which the detector outputs, and an amplitude of the oscillation mirror is accordingly adjusted, the method comprising:
- detecting a reciprocal light beam, which moves from the effective scanning region via the detector and returns back to the effective scanning region via the detector, for every oscillation cycle of the oscillation mirror and outputting a signal;
- detecting a change of the amplitude of the oscillation mirror in accordance with the output signal; and
- stopping the driving of the oscillation mirror when the change of the amplitude of the oscillation mirror exceeds a value determined in advance.

17. The method of controlling a light scanning apparatus according to claim 16, further comprising:
- calculating a gain by the controller; and
- stopping the driving of the oscillation mirror when the calculated gain exceeds a critical value determined in advance, the gain representing an increasing rate at which the maximum angle of amplitude of the oscillation mirror increases in each oscillation cycle of the oscillation mirror based on the output signal which the detector outputs in synchronization to the oscillation cycles of the oscillation mirror.

* * * * *